Sept. 20, 1932.  P. KOENIG  1,878,860
MACHINE FOR MAKING CHAINS
Filed Jan. 21, 1930  5 Sheets-Sheet 2
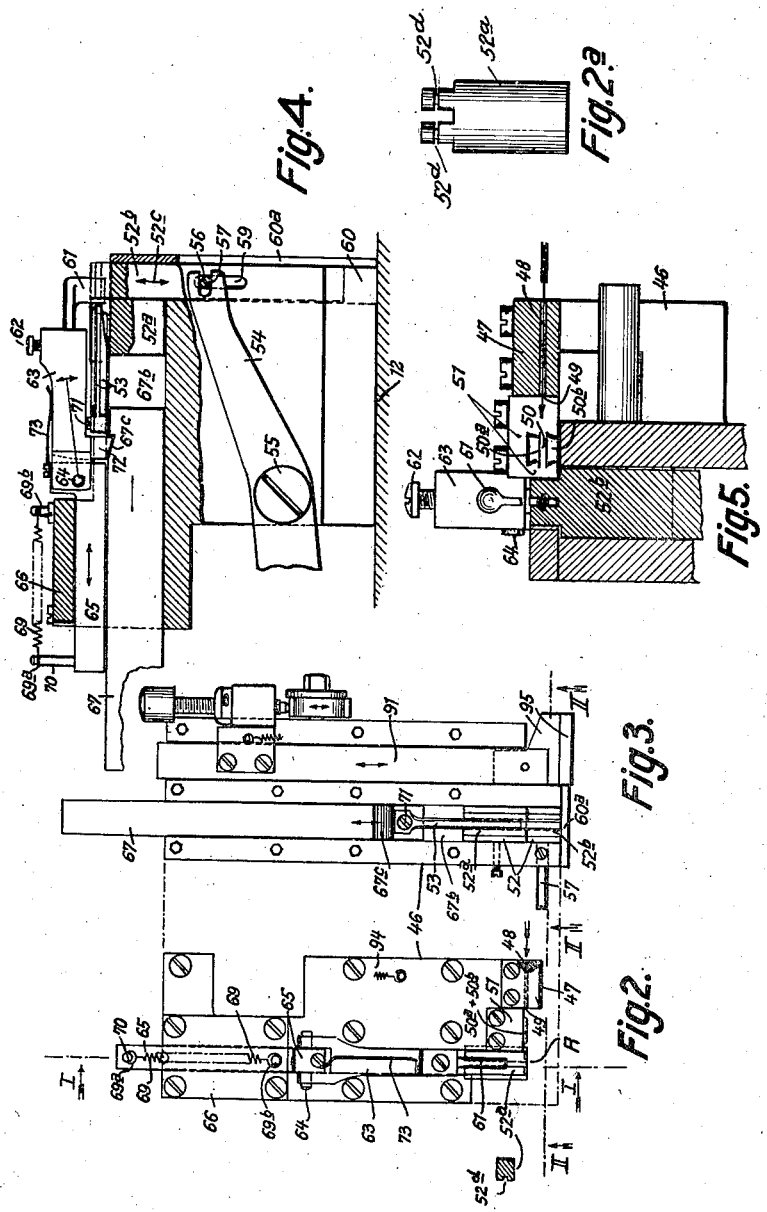

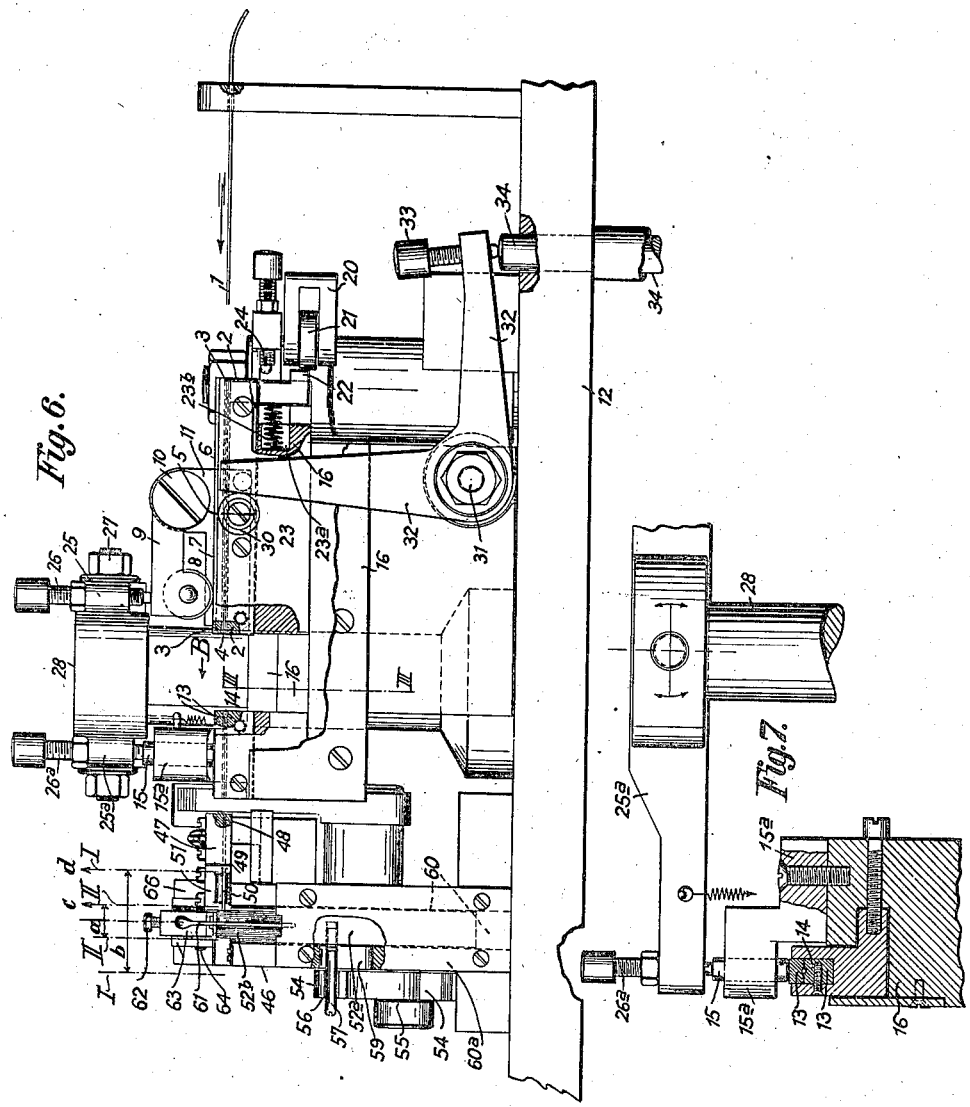

Sept. 20, 1932.  P. KOENIG  1,878,860
MACHINE FOR MAKING CHAINS
Filed Jan. 21, 1930  5 Sheets-Sheet 4
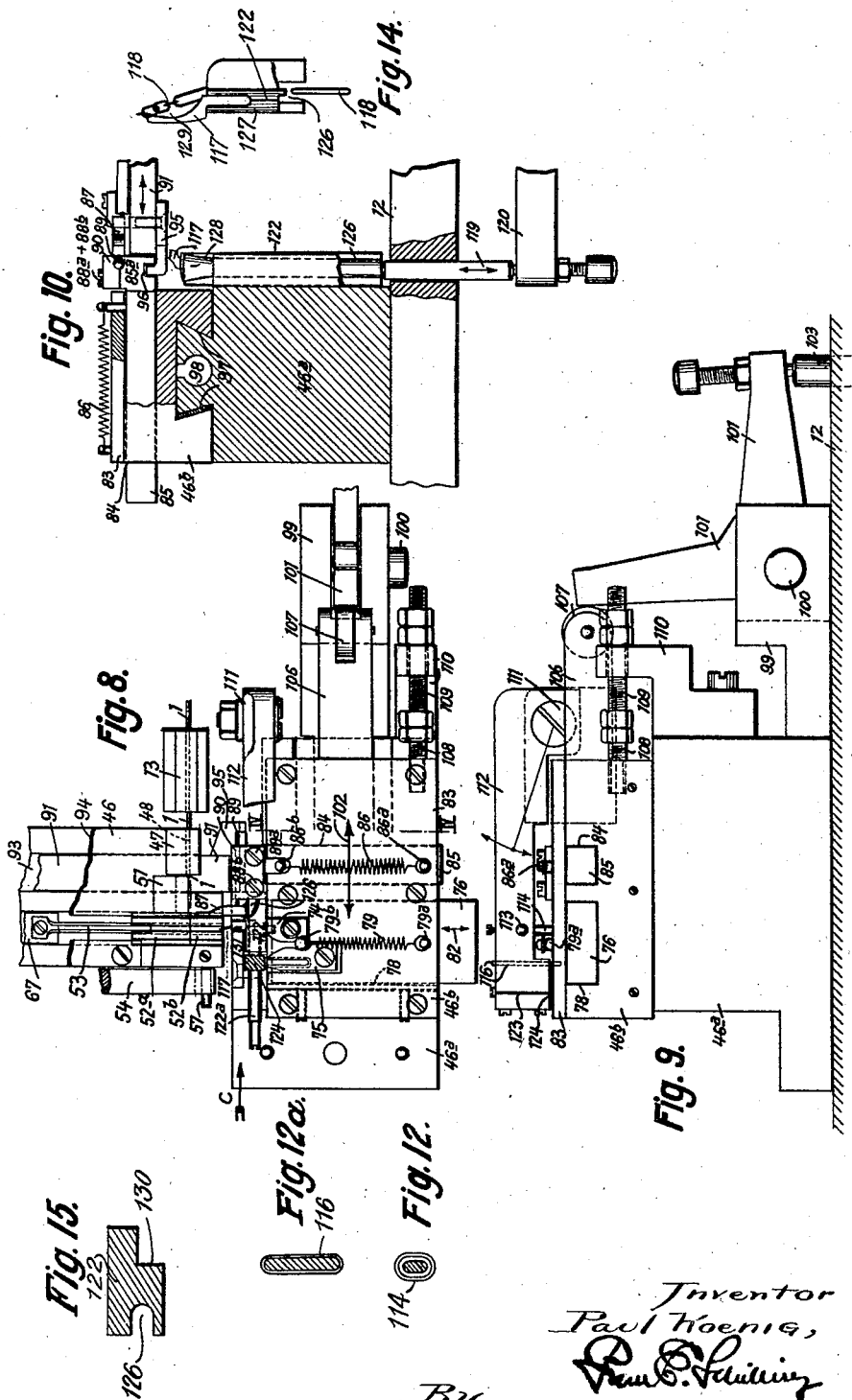

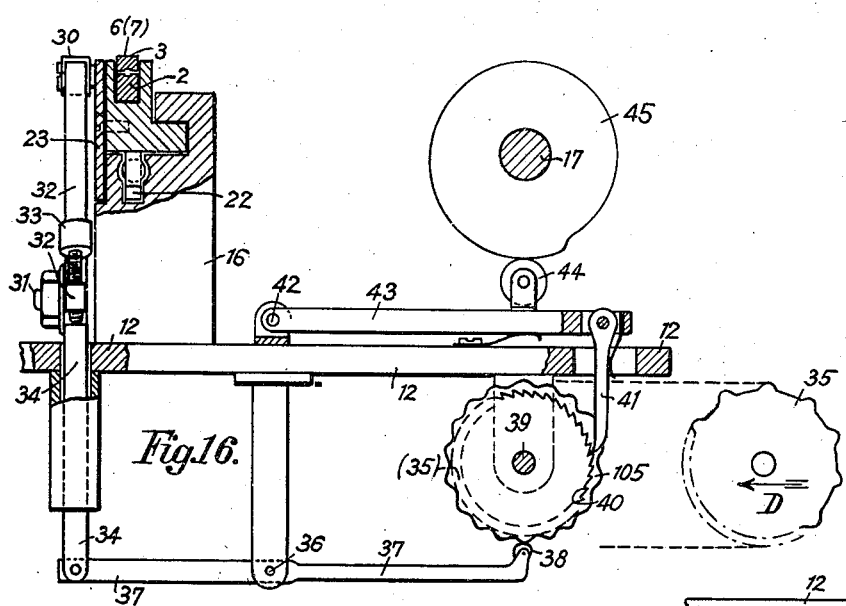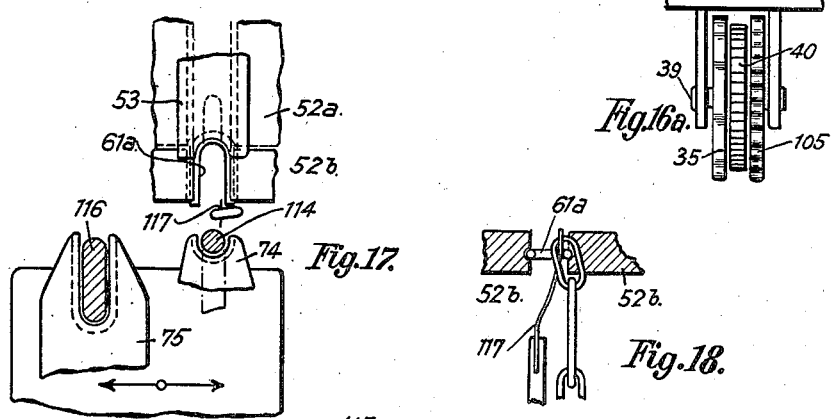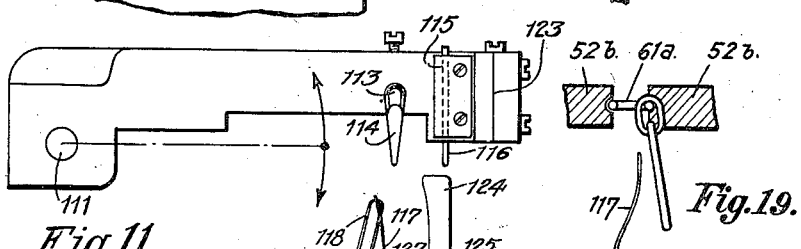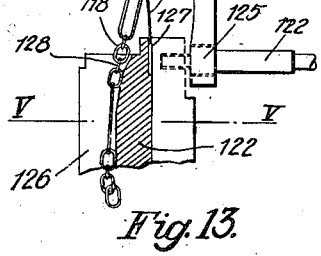

Patented Sept. 20, 1932

1,878,860

UNITED STATES PATENT OFFICE

PAUL KOENIG, OF MAPLEWOOD, NEW JERSEY, ASSIGNOR TO ERNST GIDEON BEK, OF PFORZHEIM, GERMANY

MACHINE FOR MAKING CHAINS

Application filed January 21, 1930, Serial No. 422,366, and in Germany January 21, 1929.

I have filed an application in Germany on Jan. 21, 1929, and in Great Britain on March 7, 1929.

This invention concerns improvements in machines for making chains with links of different sizes. The usual machine of this character commercially employed requires two tool holders, one for the small and one for the large links. A separate drive, with corresponding change-over mechanism, is required for each of the two sizes of link. Special gripper devices are employed for holding the chain, and the latter is moved to and fro in front of the tool holders at the corresponding working point, in order to form the small and large links therewith. The reciprocating movement, however, causes the chain to sway, so that such machines cannot be run at a high speed, since the swaying is a frequent cause of failure in forming the links.

If the different sizes of links are made on separate machines, such links must be inserted one in another by hand, a method which renders production costly and slow.

The present invention provides an improved machine wherein these drawbacks are obviated, the tools for making the different sizes of links being mounted on a common, movable tool holder, the so-called front head, and only one drive is employed for all link sizes. No special gripper devices are needed. Moreover, the chain remains stationary at the working point, the only movement being a vertical one as each new link is inserted. In this way, the chain is not subjected to any lateral swaying.

The invention resides further in the combination of this improved layout with an arrangement of improved character for joining the links.

More specifically the machine according to the invention is characterized by a wire cutting arrangement having one part displaceable along the frame of the machine in accordance with the difference in the links to be formed and simultaneously with the displacement of the parts forming the links; and a front head having two or more sets of co-operating shaping tools in order to produce links of different shapes, this front head being movable in such manner that one or the other of said sets of shaping tools may co-operate with each other and with a shaping tool disposed on the fixed rear head.

The severed length of wire, lying in a corresponding guide, is drawn, for forming the U, in known manner by the U-former into the corresponding guide, against the U-forming needle, the former then swinging upwards, and the needle pushing the formed U forwards again to the front head and to the joining tool ready in position for the corresponding large or small link. For this purpose, the front head is moved into the corresponding position.

A length of wire suitable for the size of link to be made must be fed forward and cut off, on which account the cutter acts at two different points on the abutment on the main tool head. Since the cutter is mounted in the movable part of the front head, it is moved to and fro accordingly, and thus cuts off different lengths of wire. The wire is, of course, fed to correspond, the feeding being also regulated by a corresponding cam through a lever with striker and bell-crank lever driven from the main shaft.

This represents a special problem inasmuch as a length of wire which is cut off must lie symmetrically in front of the link forming tools of the rear head whereas the cutting knife as indicated moves laterally to one side with the front head.

If the length of the wire for the larger link is ($a$) and the length for the smaller link is ($b$) and assuming a feed of $\frac{1}{2}(a+b)$, then if this magnitude is maintained for both rings the desired result of symmetrical position in the alternation of short and long links occurs and the feed does not need to be altered for this type of chain. An alteration of the feed is then only necessary when the sequence of short and long links is different. For this case only must the wire feeding mechanism be connected with the mechanism for altering the lateral motion of the front head.

In order to obtain perfect feeding and retention of the wire, the feeding mechanism is divided into two portions. The one situated nearest the stock of wire describes a lateral stroke corresponding to the length of wire needed for the link to be made, the wire being clamped between jaws and thereby introduced into the fixed feed member, the two jaws of which are open during this movement. On the completion of this feeding movement, the first feed member releases the wire whilst the jaws of the fixed member grip the wire in such a manner that the latter is brought into position, in its guide, ready to be severed by the cutter. During this operation, the chain is suspended, in the needle, by means of the link last formed. The U of the chain having been formed in the tool head in the usual manner, its one branch is pushed through the preceding link by means of which the chain is suspended in the needle. The U is then gripped, in the front head, by the corresponding joining tool, in known manner, and the needle sinks and releases the chain.

The mandrels coacting with the joining tools are adjustably secured, by means of screws, on a one-armed lever articulated on the movable front head. In order to swing the mandrels from above, into the formed link at the right moment, this lever is connected to the holder of the chain needle, in a guide, by means of a pin, since the rising and falling of said needle gives the proper time for inserting the mandrel. Two mandrels are provided, one for the large links and one for the small. The mandrel for the large link is particularly important, since this prevents the branch of the link from buckling out during the closing of the link, whilst the second mandrel, for the small link, has the task of ensuring the exactly circular shape of said link. Owing to the said lever being provided on the front head, the insertion of the correct mandrel for the link being formed at the time is ensured.

Since the tool head is divided into two parts and the joining tools corresponding to the different link sizes to be produced are mounted in a movable front head, only a single drive is needed. Moreover, by means of cams, which can be exchanged as desired, it is possible, in this manner, to make correspondingly varying links. It is also possible to work with only one cam and turn out only a single type of link. Combined and separate working is also practicable, so that a substantial advantage is afforded to, say, the jeweler's are by the present invention.

A typical embodiment of the machine is illustrated in the accompanying drawings.

Fig. 1 is a complete view of the machine, seen from above. Fig. 2 is a partial plan of the fixed tool head, showing, more particularly, the U-former; Fig. 2a is a detail view seen from A, Fig. 2, and Fig. 3 is a similar plan with the cover plate removed, in order to show the guide for the U-forming needle and the drawbar for the cutter. Fig. 4 is a section on line I—I, Fig. 2, whilst Fig. 5 represents a section on line II—II, Figs. 2 and 3, in partial elevation. Fig. 6 is a front elevation of the rear portion of the machine including the fixed tool head and feed mechanism, in which the main shaft, with its driving mechanism, has been omitted for the sake of clearness. Fig. 7 is a section (in partial elevation) from B along the line III—III of Fig. 6. Fig. 8 is a plan of the movable front head of the tool head. Fig. 9 is the corresponding front elevation, and Fig. 10 is the section along the line IV—IV of Fig. 8. Figs. 11-15 are details of Figs. 8-10.

Fig. 16 shows the mechanism for the formation of links of different sizes in a partial view of the machine taken from the right of Fig. 2.

Fig. 16a shows in end elevation the relative positions of the cams in a view taken in the direction of the arrow D, Fig. 16.

Fig. 17 shows the relative positions of the link forming tools on a larger scale.

Figs. 18 and 19 show in detail on a larger scale two different working positions during the insertion of a new link in the chain and show how this is carried by the needle.

Figure 1:
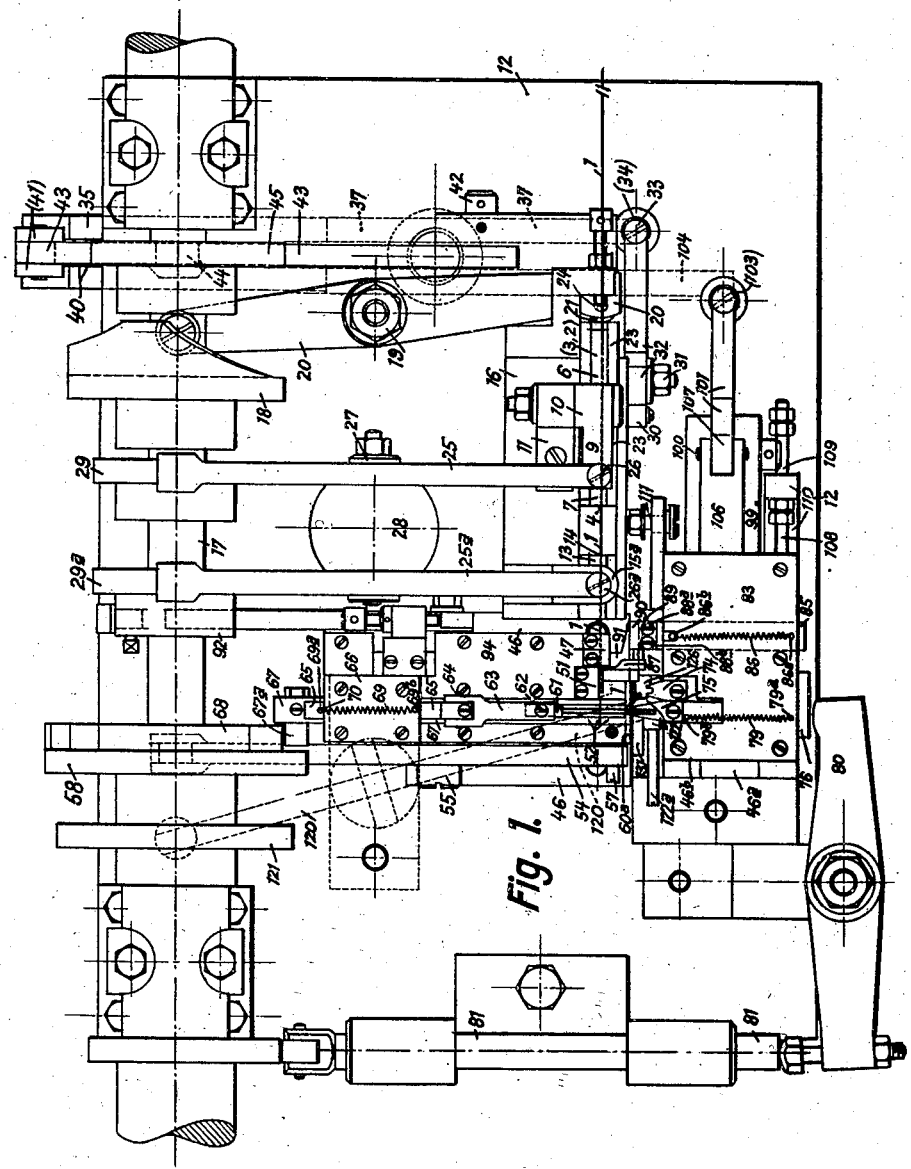

The wire 1 to be treated is gripped between the superimposed jaws 2 and 3. The contact surfaces of these jaws are each provided with a central longitudinal semi-cylindrical groove, the two grooves coinciding to form a circular passage 4 through which the wire 1 is led. 5 (Fig. 6) is the intermediate space between two sets of clamps 6 and 7. In the clamp 6, the jaw 3 lies loosely on the lower jaw 2 so as to guide the wire in a loose manner, whereas the clamp 7 is subjected to the alternating pressure of the roller 8. Said roller 8 is mounted on the lever 9, which is pivoted at 10 and, together with its holder 11, is attached to the machine table 12 by screws.

For the purpose of feeding the wire it is intermittently gripped by the clamp 7, under the action of the roller 8, and is passed over to the fixed clamp 13, which is of the same type as the one already described. Here again, the wire passes through a longitudinal channel 14 (Fig. 7) formed between the jaws of the clamp, and is gripped at intervals which alternate with the gripping of the clamp 7. The clamp 13 is under the action of a bolt 15, which is actuated in the manner hereinafter described.

Pressure is imparted to the pressure roller 8 on the lever 9 by the lever 25 acting through the adjustable pressure screw 26. The lever 25 is pivotally mounted, at 27, on the pillar 28 secured on the table 12 of the machine, and is actuated by an eccentric 29 mounted on the main shaft 17. In a similar manner, the pressure effect for stopping and clamping the wire is transmitted to the clamp 13 through the bolt 15 which is guided loosely in a sleeve 15a. Said bolt serves to transmit pressure under the action of the pressure screw 26a on the lever 25a, which is also actuated by an eccentric 29a on the main shaft 17.

The clamps 6, 7 and 13 are mounted in a solid bed 16 on the machine table, the first two clamps being adapted to slide horizontally in a guide 23 of known type therein, whilst the clamp 13 is stationary.

The clamps 6 and 7 coact, alternately, with the clamp 13 in feeding the wire, this being done in the following manner:

Under the action of a spring (not shown) which is mounted in the bed 16 in the usual manner, the slider 23 is kept pressed towards the right so that its stop 22 is in touch with the pressure roller 21 on the lever 20. This lever is pivotally mounted, at 19, on the table 12 and receives its rocking movement from the cam 18 on the main shaft. At the beginning of the feeding operation, the wire 1, at first, lies loosely in the longitudinal bores 4 and 14 of the clamps 6, 7 and 13, the guide 23, with the clamps 6 and 7, bearing against the lever 20 on the right. If now the wire is to be pushed through the clamp 13 to the working position in the tool head, the lever 25 closes the clamp 7, by means of the roller 8, thus gripping the wire immovably. The lever 20 then comes into action, in that the guide 23, with the clamps 6 and 7, is pushed towards the left by the roller 8, which is under pressure. In this way the clamp 7 remains closed and retains a firm grip on the wire, which is consequently pushed through the open clamp 13. When the feeding stroke towards the left is finished, in accordance with the throw of the cam 18, the clamp 13 is closed by the pressure bolt 15 under the action of the lever 25a with its pressure screw 26a, which is actuated by the eccentric 29a, and the wire is held fast in this new position. At the same time, the clamp 7 is released by the pressure roller 8 and lever 20, and therefore opens, so that the guide 23, with the clamps 6 and 7, are returned to their original position on the right under spring action. A fresh quantity of wire is gripped, under the same working conditions as those already described, and is fed to the tools in order to be formed into a link.

Since different lengths of wire have to be fed, in accordance with the different link sizes to be made, the guide 23 must therefore be arranged to have a second stroke.

For this purpose there is provided on the front side of the guide 23, a roller 30, which is mounted on a screw, and against which presses the one arm of a bell-crank lever 32, pivotally mounted on the bed 16 at 31, whilst the other arm of said lever bears on the thrust rod 34 by means of a set screw 33. Said thrust rod, which is guided vertically in the machine table 12 is operated from a cam 35 mounted underneath the table 12 so as to vary the position of the beginning of the stroke intended for the short feed movement needed for the formation of the small chain link. Fig. 16 shows, diagrammatically and by way of example, the transmission of movement from the cam 35 through a double lever 37 mounted at 36. The stroke of this lever imparts a reciprocating vertical movement to the thrust rod 34, so that the bell-crank lever 32 receives the corresponding movement so as to limit the backward movement of the slide 23.

The roller 38 of the lever 37 runs on the rim of the cam 35, the crests and hollows of which vary the rearward position of the slide 23. According to the design of the cam, correspondingly different large and small links can be produced.

The cam 35 mounted on the machine frame at 39, is mounted on its shaft 39 so as to turn in conjunction with a ratchet wheel 40, and said wheel is turned by means of a pawl 41. Said pawl is mounted on the lever 43, which is pivoted on the machine table 12 at 42 and carries a roller 44 which runs on the cam 45 on the main shaft, thereby operating the wheel 40 and cam 35 through the pawl 41. In Fig. 16, the cam is indicated on the right, for the sake of clearness, because in this view it comes into position in front of the ratchet wheel, and the latter should not be hidden, on account of the following description.

After the wire 1 has left the clamp 13, it traverses a closed guide 47, screwed on to the tool head 46, the bore 48 of said guide being of such diameter that the wire can pass through unhindered. At 49 the wire issues from the guide, and then lies in a groove 50 (Fig. 5) corresponding to its thickness and provided in the abutment 51 for the cutter. The groove is formed between the two ridges 50a and 50b.

After leaving the groove 50, the wire 1 passes through the groove of another guide 52 in the tool head 46, consisting of two parts (Figs. 2–5), namely a stationary part 52a and a part 52b adopted to move in the head 46 in the direction of the arrow 52c (Fig. 4). In conjunction with the groove on the facing contact surface of the part 52a a guide is formed for the passage of the wire.

The advanced and cut-off piece of wire is, by means of former 61, pulled into the immovable jaws 52a and thus shaped like a U. Whereupon it is moved forward by means of the needle 53 and inserted in the last link hanging at the hook. Tool 52b which is provided with grooves corresponding to those of the jaws 52a, has moved downward before the wire is in contact with the front part of the jaws 52a. The tool 52b stays down until the U-link is shaped and pulled into the jaws 52ª, whereupon it moves up again and conveys the U-shaped link into the finished ring-link at the hook. The tool 52ᵇ merely acts as a conveying means.

The guide member 52b is movable up and down in the head 46 (in the direction of the arrow 52c) in order that, when the U-former needle 53 is moved, in known manner, towards the former tools in the front head 46a, said member can give way downwards. It receives this movement from a lever 54, which is pivotally mounted on the head 46 at 55 and engages, with its slot 56, the pin 57 provided on the guide 52b. The lever 54 is actuated by a cam 58, on the main shaft 17, in the usual manner. The pin 57 projects outwardly from the guide 52b through a longitudinal slot 59, on the side of the head 46, into the slot 56 of the lever 54. The head 46 is provided with a corresponding recess 60, in which the guide 52b is adapted to move up and down. The recess is covered, on the front side, by a plate 60a.

A length, of the dimensions a or b (according to the size of link to be formed) is cut off from the wire (inserted in the tools 47, 51 and 52a and 52b) by means of a cutter, in the manner hereinafter described, said length being indicated in Fig. 6 by the measurement lines a and b between the broken-line verticals I—I and II—II. The two right hand verticals I and II point towards the cutting points c and d on the abutment 51, where the requisite length of wire is cut off. For a large link the feed stroke is from c to I and for a small link from d to II. The feeding tools must be actuated accordingly from the main shaft 17, as already described.

The forming of the links is effected in the following manner.

When the desired length of wire (b for example) has been inserted and cut off, the guide member 52b is in the raised position so that the wire lies in the groove 50 and in the bore formed by the guides 52a and 52b, so that it can then be gripped by the U-former. Said former 61 (Figs. 2, 4 and 6) which is of the usual type, is retained, by the screw 62, in its holder 63, which is articulated at 64 on the sliding rod 65. The rod 65 is guided in a guide block 66 in the head 46 and rests slidably underneath on a thrust rod 67. Said rod 67 is reciprocated in known manner, through its roller 67a, by a cam 68 on the main shaft 17, being suitably mounted, by means of the recess 67b, in the head 46. At 71 on its front end is mounted the known former needle 53 which shares the movements of the rod 67 in the aligned slots provided in the previously mentioned guides 52a and 52b and designed in accordance with its cross section.

As described below, the movement of the rod 67 influences the movements of the slider 65 and U-former 61 for gripping the severed length of wire and forming the link. The carrier 63 of the U-former is subjected to the action of a spring 73, and its pawl-like nose 72 is disposed in a corresponding notch 67c in the rod 67, being retained therein by a tension spring 69. One end of said spring engages, at 69a, with a pin 70 on the slider 65, its other end being attached to the guide block 66 at 69b. Thus the pawl 72 of the holder 63 resting on the slider 65, is in continuous engagement with the notch 67c of the rod 67, in such a way that the pawl lies against the back of the notch, when the rod 67 is moved towards the left in opposition to the right-hand pull of the spring 69. In this position, the U-former is swung in front of the former needle 53 so as to grip the piece of wire, in order that this latter may, for the purpose of forming the U, be drawn against the needle and towards the left, in the shaping groove of the guide 52, as far as the desired stop. The rod 67 is then pushed forward again, towards the right, by the cam 68. The slider 65 follows this movement with its inwardly swung U-former (which retains the formed U between itself and the needle 53), under the action of the spring 69 on the pin 70, until said pin strikes against the block 66, thereby arresting the movement of the slider 65 and former. The rod 67, however, continues to move, so that the needle pushes the then formed U before it in the guide 52 to the front head 46a with its known jointing tools. This necessarily causes the slanting surface of the pawl 72 to ride upwards on the slope of the notch 67c, thus swinging the holder 63 upwards on its pivot 64 and swinging the U-former 61 out of the guide 52, in order to release the formed U. At the same time as the U-former is swung out, the guide member 52b is depressed by the lever 54, so that the carrier needle, in which the chain is suspended by means of the previously formed link, is raised to enable one branch of the last formed U to be easily inserted in said link on leaving the guide 52a. The means of guiding the carrier needle will be described later. The tools in the front head—which, in part, are already known—now come into operation. The former needle is now moved back to the left again, and in the interim a fresh length of wire has been fed in and cut off, and the pawl 72 of the holder 63 again engages in the notch 67c, in order that the freshly inserted length of wire in the guide 52 may be gripped, as already described, for forming a new link. The cycle of operations of the tools in the head 46 begins at accurately defined intervals, after the tools in the front head 46a have performed their task. The tools in the front head operate in the following manner:

The U 61a (Fig. 17) formed in the guides 52a and 52b by the former needle 53 and the former 61 for example for the small link is fed to the known closing tool 74 for closing and is closed thereby in known manner. The front head 46a is shown in Figs. 8 and 17 set to the left in such manner that the small tool 74 is in front of the working position of the tool of the head 46 for small links. During the U formation 61a by the tools 52a, 52b, 53 and 61 the chain hangs in readiness with its end member in the carrying needle 117 in front of the tool 74 in such manner that when the U 61a is advanced the right hand limb is passed through the tool 74 by the pointed member. The relative position of the tools is shown on a larger scale in Fig. 17 as a unit. The U which is to be closed now hangs half in the guide 52b and in the tool 74 whereas its right hand limb carries the chain on its own member. As soon as the limb of the U is inserted in the end member of the chain the carrying needle moves downwardly and thus causes the member to be completed to take up the weight of the chain. In Fig. 18 is shown a front view of the insertion of the limb to the U through the end member of the chain and shows how this is still carried by the needle 117. Fig. 19 shows in the same view the manner in which the chain is carried by the chain member ready to be formed. At this point of the operation the needle is guided downwardly. When the link is completed the needle is then moved upwardly again in known manner so that it takes up the newly formed link with its own end member for carrying the chain as will be described in greater detail later. The tool 74 is mounted, together with the tool 75 for closing the large links, on a broad slider 76 mounted in the upper part 46b of the front head 46a. This slider is adapted to slide in a recess 78, and is controlled by a tension spring 79 and the lever 80 see Fig. 1 which, by means of the thrust rod 81, transmits movement from the main shaft 17 to the slider 76 in the direction of the arrow 82. A cover plate 83 closes the recess 78 and a second recess 84, towards the top. The second recess 84 houses the guide rod 85, which slides under the tension of a second spring 86, and the front end of this rod carries the cutter 87, as shown as a side elevation in Fig. 10 along the sectional line IV—IV of Fig. 8. The cutter 87 is adjustably clamped between the plate 90 and the head 85a of the rod 85 by means of two screws 88a and 88b acting on its rectangularly bent shank 89.

The springs 79 and 86 are suspended, on the plate 83, at 79a and 86a respectively, and on pins 79b and 86b, of the sliders 76 and 85. In this manner, the jointing tools 74 and 75 are continuously held against the known lever 80 for closing the link U. The pull of the spring 86 acts, through the slider 85, on the cutter 87, by holding it away from the abutment 51 against the action of the drawbar 91 guided in the head 46 and actuated from the main shaft 17 through an eccentric 92 in known manner. The drawbar is adapted to slide in a recess 93 in the head 46, and is held therein by a cover plate 94.

By means of an angle member 95 (Figs. 3, 8 and 10) the drawbar 91 engages, from the head 46, in a groove 96 in the head 85a of the rod 85, on which the cutter 87 is mounted. By this means, the eccentric 92 causes the cutter 87, mounted on the slider 85, to cut against the abutment 51—in order to cut off the requisite length of wire, as already described—at the point c or d (Fig. 6), according to the setting of the front head 46a.

The requisite setting, to right or left, of the upper part 46b of the front head 46a, to bring the jointing tools 74 and 75 into the desired working position in front of the tools in the head 46 is effected in the same manner as already described in connection with the feed by the bell-crank lever 32. The head member 46b is adapted to slide in a dovetail guide 97 on its lower member 46a fixed on the table 12. A spring (not shown) in the bore 98 holds it towards the right in the abutment, in known manner, against a bell-crank lever 101 mounted at 100 in the bracket 99. The corresponding throw of the bell-crank lever pushes, or sets, the head member 46b, in the direction of the arrow 102, into the requisite working positions in relation to the front head 46. The lever 101 is actuated from below by a thrust rod 103 passing through the table 12. Underneath the table, the rod 103 is actuated by a lever 104 (indicated by broken lines in Fig. 1), in the same manner as the previously described thrust rod 34 is actuated by the lever 37 and cam 35. A cam 105 adapted for the setting of the front head is actuated, through the previously mentioned ratchet wheel 40, on the shaft 39, and acts through the corresponding lever 104 of the thrust rod 103, on the setting lever 101. The arrangement coincides completely with the diagram in Fig. 16, so that no further illustration is needed.

A holder 106 mounted on the upper member 46b carries the pressure roller 107 which takes up the pressure of the lever 101 for the reciprocating movement. To enable the throw to be adjusted as desired, a set screw 108 on the member 46b bears against a second set screw, 109 (serving as a stop) in the bearing 110 of the fixed front head.

In order to ensure perfection of shape in closing the preformed U to a link, the links are shaped, according to the present invention, round a corresponding mandrel. For this purpose there is articulated, on the front head member 46b, at 111, a lever 112 which carries, at 113, a mandrel 114 of circular section for the small links, and at 115 a mandrel 116 of elongated section for the large links. In Fig. 9 the lever can be seen, as mandrel carrier in front elevation, the mandrel 116 being invisible because it is mounted on the rear side of the lever: whilst in Fig. 11, in order that it can be seen better, the mandrel carrier is swung to the right, in the plane of the picture, on its pivot 111, so that the arrangement of the mandrel on the rear side can be shown.

The swinging of the mandrel on the lever 112 coincides with the timing of the ascent and descent of the needle 117 which carries the chain 118. On this account, the movement transmitted to the needle by the striker 119, in known manner, from the main shaft 17 through the lever 120 and through the cam 121, is transmitted for this purpose, through a pin 122a on the needle carrier 122, to the finger 124 attached at 123 to the lever 112. A bore 125 in the finger 124 engages over the pin 122a, and is sufficiently wide to allow the pin sufficient play in rising and falling. When the corresponding chain link is enclosed in the jointing tool, the needle carrying the chain is out of engagement with the chain and is led downwards—the chain being suspended in an arm of the link to be formed—whilst the needle carrier 122 swings the mandrel carrier 112 in a positive manner into the link to be formed, by means of the pin 122a and through the finger 124, inasmuch as the striker 119 releases the needle holder on the under side, so that this and the mandrel carrier move downward, by gravitation, into the link U which is to be closed. Since the mandrel carrier 112 resting on the upper member 46b is moved to and fro with the latter into the relative working position before the front head, the mandrel required for the time being accordingly comes into position in the link to be formed. For this purpose, the pin 122a is of a length corresponding to the stroke, so that it slides in the bore 125 of the finger 124 because, according to the invention, the needle carrier does not share the lateral stroke. The needle is formed of sheet metal of the form shown in Fig. 14 and is bent over laterally as shown in the edge view thereof in Fig. 13.

At the same time, the needle carrier 122 also serves as a guide for the chain 118 suspended in the needle 117. For this purpose, the carrier is provided with a deep vertical groove 126 (Figs. 8, 10 and 12–15), in which the chain 118 hangs down freely through a corresponding hole in the table 12. The needle 117 is inserted in a milled dovetail groove 127, (Figs. 13 and 14) in the top of the carrier, and is bent slightly to one side, so that the chain bears, in an oblique position without vibration, against a slope of the groove 126, at the upper point 128. This contact with the slope 128 automatically constrains the chain to turn into the correct position, in the needle, for the insertion of the one arm of the formed U. The uppermost end of the chain should hang quite free between the point of the needle and the slope 128, and it is for this reason that the needle is bent in a curve 129 towards the left, as shown in elevation in Fig. 14 and viewed from C in Fig. 8.

The needle holder 122 is stepped at 130 (Fig. 15, section along V—V of Fig. 13). It is slidably mounted in a vertical recess of corresponding cross section in the fixed front head 46a, and is held by a plate 131, which fits into the step 130 and is screwed on the head 46a.

The new, partly shaped link is moved into the needle while the chain is hanging on it. The very moment the newly shaped link is thus moved through the chain link at the hook and caught by the finger at the top and back of the hook, the latter moves downward. The link is then completely closed by the tools. The moment the link is completed by the tools, the needle 117 moves up again into this newly formed link. Then the tools part and the link falls automatically in line to receive another U-shaped link.

Having now particularly described and ascertained the nature of my said invention and in what manner the same is to be performed (as communicated to me from abroad) I declare that what I claim is:

1. Machine for making chains with links of different sizes comprising a wire cutting arrangement displaceable along the frame of the machine in accordance with the sizes of the links to be formed, and means partially forming the links; and a front head having two cooperating sets of co-operating shaping tools cooperating with said means to produce links of different shapes, said front head being movable to present one or the other of said sets of shaping tools to co-operate with said means.

2. A machine as claimed in claim 1 comprising a needle for carrying and positioning the last-formed link, and a holder provided with a groove in which the formed portion of the chain slides, said last-formed link being supported in the point of the needle in such position as to enable the succeeding link to be inserted.

3. A machine for making chains comprising a fixed rear head, means for feeding wire to said head, a movable front head, a cutter carried by the latter, means for moving said cutter for cutting the wire into different predetermined lengths, bending means carried by the rear head for partially forming the different lengths, and a plurality of dies movably carried by the front head and independently cooperating with said bending means to produce links of different sizes.

4. The structure of claim 3 and a plurality of mandrels carried by the front head and cooperating with said bending means and dies.

5. A machine for making chains comprising a fixed rear head, wire bending means carried by said head, means for feeding different lengths of wire to said bending means, a plurality of forming dies, means for selectively presenting said dies in cooperative relation with said bending means, and means for successively forcing said wire into said dies to produce links of different sizes.

6. The structure of claim 5 and a vertically movable chain supporting member, and means for moving said member into engagement with the last formed link to position the latter for the succeeding link forming operation.

7. A machine for making chains comprising a wire bending means, means for feeding different lengths of wire to said bending means, a pair of movable dies, means for forcing the wire into the dies from said bending means to form links of different sizes, and a chain supporting means to position the links for the successive link forming operations.

8. A machine for making chains comprising a fixed rear head, means for feeding wire to said head, a movable front head displaceable in the direction of the wire feed, a cutter carried by the front head, means for moving said cutter for cutting the wire into different predetermined lengths, bending means carried by the rear head for partially forming the lengths into links of different sizes, and a plurality of dies carried by the front head and independently movable laterally with respect to said head to bring said dies independently into cooperation with said bending means to produce finished links of different sizes.

9. A machine for making chains comprising a fixed rear head, means for feeding wire to said head, a movable front head displaceable in the direction of the wire feed, a cutter carried by the front head, means for moving the cutter for cutting the wire into different predetermined lengths, a grooved shaping block carried by the rear head, a laterally movable former for gripping the different lengths of wire and drawing them into the grooved shaping block to form U-shaped links of different sizes, means for ejecting each link from the block and inserting one of the arms of said link into a previously formed link, and a plurality of dies carried by the front head and independently movable laterally with respect to said head to bring said dies independently into cooperation with said bending means to produce finished links of different sizes.

In testimony whereof I have affixed my signature.

PAUL KOENIG.